United States Patent [19]
Raju

[11] Patent Number: 5,177,127
[45] Date of Patent: Jan. 5, 1993

[54] MOLDED COMPOSITE POLYESTER ARTICLES HAVING IMPROVED THERMAL SHOCK RESISTANCE

[75] Inventor: Katari S. Raju, Jacksonville, Fla.

[73] Assignee: Reichhold Chemicals, Inc., Durham, N.C.

[21] Appl. No.: 646,886

[22] Filed: Jan. 28, 1991

[51] Int. Cl.⁵ ............................................. C08K 7/02
[52] U.S. Cl. ................................. 523/500; 523/514; 523/517
[58] Field of Search .................. 523/514, 500, 517

[56] References Cited

U.S. PATENT DOCUMENTS

| | | | |
|---|---|---|---|
| 3,951,886 | 4/1976 | Miyake et al. | 528/279 |
| 3,992,480 | 11/1976 | Dorfman et al. | 523/516 |
| 4,148,841 | 4/1979 | Schwartz et al. | 523/515 |
| 4,285,845 | 8/1981 | Russell | 523/518 |
| 4,522,977 | 6/1985 | Gardner | 525/20 |

OTHER PUBLICATIONS

Bjorksten: "Polyesters and Their Applications"; Rheinhold Publishing Corp.; 1956; p. 161.

Primary Examiner—Paul R. Michl
Assistant Examiner—Edward Cain
Attorney, Agent, or Firm—Rodman & Rodman

[57] ABSTRACT

A molded article such as a bathroom sink having improved thermal shock resistance is produced by molding the article from a composite unsaturated polyester resin in which the resin in the cured state has an HDT value in the range of about 68° C.–78° C.

22 Claims, No Drawings

MOLDED COMPOSITE POLYESTER ARTICLES HAVING IMPROVED THERMAL SHOCK RESISTANCE

FIELD OF THE INVENTION

This invention relates to a molded polyester article and more particularly to a molded composite polyester article having improved resistance to thermal shock cracking.

DESCRIPTION OF THE PRIOR ART

Composite polyester compositions, that is, polyester resins admixed with high levels of fillers and pigments find wide application in the manufacture of plumbing fixtures, as for example, vanities, sinks and bathtubs. It is estimated that more than 100 million pounds of polyester resins are sold for this application and its use in plumbing fixtures is growing rapidly. The reason that composite polyester materials have achieved such acceptance is that they permit wide styling flexibility in both design and color.

The polyester resins used in the preparation of the moldable composite compositions are unsaturated polyester resins prepared by esterification of a glycol with an unsaturated acid component such as maleic anhydride or fumaric acid. The resulting polyester is mixed with a vinyl monomer such as styrene and the unsaturated double bonds in the polyester provided by the unsaturated acid component are used as sites for the copolymerization with the vinyl monomer. Commercially available intermediate unsaturated polyesters usually contain about 30% styrene or other vinyl monomers. Copolymerization starts with the addition of a peroxide or other free radical catalyst and a metal dryer.

Composite materials are prepared by mixing the unsaturated polyester resin with high concentrations, e.g. 60-80% by weight, of a suitable filler such as calcium carbonate, clay, talc, alumina, diatomaceous earth, barium sulfate and mixtures of these fillers.

Representative prior art related to molded composite unsaturated polyester articles include U.S. Pat. No. 3,196,136 to Mayer et al which discloses the preparation of an unsaturated polyester comprised of the reaction product of isophthalic anhydride, fumaric acid and a glycol such as diethylene glycol and ethylene glycol.

U.S. Pat. No. 4,134,881 to Cuddihy et al discloses polyester polymers consisting essentially of ester condensation products of specific proportions of propylene glycol, adipic and fumaric acids, isophthalic acid and halogenated phthalic anhydride. The polyesters are disclosed as being particularly useful in high performance matrices for fiber composites requiring properties including a combination of high heat deflection temperature (HTD) e.g., in the order of 90° C. and high tensile elongation, e.g., on the order of 3%.

U.S. Pat. No. 4,426,491 to Gardner et al discloses fiber reinforced maleic anhydride based polyester composites having an HDT in the range of 211-232° C.

U.S. Pat. No. 4,844,944 to Graefe et al discloses a plumbing fixture fabricated from a multilayer polymer structure having a relatively thin acrylic resin finish layer bonded to a relatively thick reinforced cross-linked isocyanate modified thermosetting polyester foam resin substrate layer.

One of the problems encountered in the use of composite polyester resins in bathroom fixture applications is cracking of the molded article from thermal shock due to repeated contact with hot and cold water. This phenomenon is particularly troublesome where sinks receive heavy duty service, such as in hotels and motels. For example, U.S. Pat. No. 4,219,598 to Noma et al discloses the manufacture of molded unsaturated polyester resin articles such as sinks which are constructed of a thin transparent gel coat layer over a base layer, the gel coating providing gloss and hardness. The gel coating is comprised of unsaturated polyesters, saturated polyesters and styrene monomers. The base layer is a calcium carbonate filled unsaturated polyester resin prepared from maleic anhydride, phthalic anhydride, ethylene glycol and propylene glycol. To accelerate cross-linking of the unsaturated polyester, a vinyl monomer such as styrene is included in the composition. To prevent the composition from cracking, a thermoplastic resin such as a polyethylene resin is added to the unsaturated polyester composition.

Due to the continued existence of the thermal shock induced cracking problem in molded composite articles, the industry, in order to study and solve this problem has devised a thermal cycling test. This test assigned the number Z124.3 by the American National Standard Institute (ANSI) for the thermal shock testing of bathroom sinks is used to determine the resistance of molded composite sinks to bowl cracking whereby the bowl is contacted with water at a flow rate of one gallon per minute, the temperature of the water being cycled between 50° and 150° F. over a 4 minute period. These temperatures are based on water temperatures normally encountered in use.

When subjected to this thermal shock test, modified to higher temperatures (45/175° C.), bathroom bowls fabricated from composite unsaturated polyester resins generally encounter cracking within about 500-1000 cycles. This relatively low thermal shock value indicates that there is a substantial need for improvement in the thermal shock resistance of bathroom fixtures molded from composite polyester resin compositions.

SUMMARY OF THE INVENTION

In accordance with the present invention, there is provided a molded article exhibiting substantially increased resistance to thermal shock, the article having been molded from a composite composition comprised of an inorganic filler and an unsaturated polyester resin, the polyester resin in the cured state having a heat deflection temperature in the range of about 68° C. to about 78° C.

As will hereinafter be demonstrated, plumbing fixtures, e.g., sinks molded from calcium carbonate filled unsaturated polyester resins in which the cured resin has an HDT in the range of about 68° C.-78° C., when tested for thermal shock in accordance with a more severe form of the ANSI Z124.3 test procedure, exceed 4000 cycles without cracking.

DESCRIPTION OF THE PREFERRED EMBODIMENTS

In general, any of the known and conventionally liquid, ethylenically unsaturated polyesters can be used to prepare composite unsaturated polyester resins to be molded into bathroom fixtures in accordance with the practice of the present invention. In determining the utility of these polyester resins for the molding of bathroom fixtures having improved thermal shock resistance, it is critical that the unsaturated polyester resin in the cured, thermoset state possess a heat deflection value of about 68° C.–78° C. when tested in accordance with ASTM testing procedure ASTM D-648.

The unsaturated polyesters used in the practice of the present invention are generally prepared by the polyesterification of polycarboxylic acid and/or polycarboxylic acid anhydrides with polyhydric alcohols usually glycols. At least one of the components used in the preparation of the unsaturated polyester contains ethylenic unsaturation, usually the polycarboxylic acid or corresponding anhydride. Suitable unsaturated polyester resins are fabricated from dicarboxylic acids such as adipic acid, phthalic acid, phthalic anhydride, terephthalic acid, isophthalic acid, hexahydrophthalic acid, hexahydrophthalic anhydride, trimelitic acid, trimelitic anhydride, maleic acid, maleic anhydride, fumaric acid and the like, and mixtures thereof.

Suitable polyhydric alcohols include ethylene glycol propylene glycol, diethylene glycol, dipropylene glycol, trimethylol propane, trimethylol ethane, neopentyl glycol, pentaerythritol, glycerine, triethylene glycol, cyclohexane dimethanol, hexane diol, butylene glycol and the like and mixtures thereof.

An unsaturated polyester resin preferred for use in the practice of the present invention can be prepared from isophthalic acid, maleic anhydride, propylene glycol, dipropylene glycol and neopentyl glycol.

A particularly preferred class of unsaturated polyester resins are unsaturated polyester resins chain-stopped with a monofunctional acid or alcohol such as benzoic acid or benzyl alcohol. Exemplary of such chain stopped unsaturated polyester resins are resins prepared by coreacting a mixture of propylene glycol, dipropylene glycol, phthalic anhydride, maleic acid and benzoic acid. The unsaturated polyester resin has a molecular weight varying from about 450 to 2500. These chain-stopped unsaturated polyester resins are more fully described in aforementioned my copending patent application Ser. No. 581,032 U.S. Pat. No. 5,118,783 entitled "Chain Stopped Unsaturated Polyester Resins" filed Sep. 12, 1990, the entire disclosure of which is incorporated herein by reference.

The chain stopped unsaturated polyesters can be further modified with hydroxy alkyl acrylates such as hydroxyethyl acrylate and methacrylate, other hydroxy terminated polyesters and diisocyanates such as toluene diisocyanate. The preparation of these modified urethane acrylate chain stopped unsaturated polyester resin compositions are also fully described in the aforementioned copending patent application Ser. No. 581,032, U.S. Pat. No. 5,118,783.

The unsaturated polyester resin can be combined with a copolymerizable monomer which contains a terminal vinyl group to prepare syrups into which an inorganic inert filler may be incorporated to obtain formulations suitable for molding applications. These monomers are well known in the art and include hydrocarbon monomers such as styrene, alphamethyl styrene, methyl styrene, and 2,4-dimethyl styrene.

Suitable inorganic filler materials which can be combined with the unsaturated polyester resins to prepare composite compositions suitable for molding into bathroom fixtures include inert materials such as calcium carbonate, kaolin, talc, aluminum trihydrate, silica and diatomaceous earth. Colorants and pigments may also be incorporated in the unsaturated polyester resin to provide the desired decorative effect in the molded article.

The filler material may be combined with the unsaturated polyester resin at concentrations of about 60 to about 80% by weight of the filler admixed with about 20 to about 40% by weight of the unsaturated polyester resin.

Cross-linking of the unsaturated polyester resin and copolymerization with vinyl monomers is accomplished with one or more free radical polymerization initiators or catalysts, notably organic peroxides, including, di-t-butyl peroxide, t-butyl peroxy-2-ethyl hexanoate, benzoyl peroxide, t-butyl peroxyisobutyrate, methyl ethyl ketone and the like. The polymerization initiator is generally used at a concentration of from about 0.1 to about 2% by weight based on the total weight of unsaturated polyester and vinyl terminated monomer.

The cross-linked polyester must exhibit an HDT value in the range of about 68° C.–78° C. in order to be considered for the preparation of composite unsaturated polyester compositions which can be molded into articles having improved thermal shock properties.

If the HDT of the unsaturated polyester resin in the cured state is outside the temperature range of about 68° C.–78° C., the composite composition will exhibit poor performance when molded into structural forms such as sinks. Thus, if the HDT value of the cured resin is less than about 68° C., the thermal shock value will be 600 cycles or less. If the HDT of the cured resin exceeds about 78° C., the molded parts tend to crack during molding and the high exotherm associated with HDT's in excess of about 78° C. cause extensive damage to the surface of the mold used for the fabrication of the part.

The composite unsaturated polyester resin is molded into bathroom fixtures such as sinks by pouring the catalyzed material into a mold at ambient conditions. Under these conditions, the molded article can be produced in a curing period of about 30 to 120 minutes.

Molded articles prepared using the composite unsaturated polyester resins of the present invention in which the cured polyester resin has a heat distortion value of about 68° C.–78° C. are found to exhibit substantially improved thermal shock properties and can be easily fabricated by conventional unsaturated resin technology.

The following specific examples show the preparation of molded articles having improved shock properties. All parts and percentages are by weight unless otherwise noted.

EXAMPLE 1

A series of maleic anhydride based unsaturated polyester resins $P_1$, $P_2$, $P_3$, and $P_4$ were prepared using the glycol and acid components listed in Table 1. The listed components at the indicated concentrations were charged to a 5 liter, 4 necked flask equipped with a heating mantle, stirrer, thermometer, inert gas inlet tube and a vacuum jacketed fractionating column filled with glass helices. A still head with thermometer and take-off condenser was mounted on the top of the fractionating column. The temperature of the reaction mixture was raised gradually to 180° C. and held for two hours and then increased to 200° C. The reaction was continued to an acid value of 9 at 67% non-volatiles (NV) in styrene monomer. The temperature of the distilling vapors at the top of the column was maintained below 105° C.

The physical properties of the unsaturated polyester resins prepared in accordance with the above procedure are recorded in Table 1.

TABLE 1

Benzoic Acid Chain Stopped Maleic Anhydride Based Unsaturated Polyester Resin Composition

| | Concentration (moles) | | | |
|---|---|---|---|---|
| | $P_1$ | $P_2$ | $P_3$ | $P_4$ |
| Components | | | | |
| Propylene glycol | 0.8 | — | — | 0.85 |
| Diethylene glycol | 0.25 | — | — | — |
| Dipropylene glycol | — | — | — | 0.2 |
| Trimethylol propane | — | 0.18 | 0.2 | — |
| Neopentyl glycol | — | 0.92 | 1.0 | — |
| Adipic Acid | 0.04 | — | — | — |
| Isophthalic Acid | — | — | 0.52 | — |
| Phthalic anhydride | 0.635 | 0.45 | — | 0.5 |
| Maleic Anhydride | 0.325 | 0.41 | 0.38 | 0.4 |
| Benzoic Acid | * | 0.14 | 0.095 | 0.075 |
| Physical Properties | | | | |
| Gel Time @ 77° F., (Min.) | 15.5 | 14.7 | 17.8 | 15.4 |
| Gel Peak, Min. | 15.7 | 14.5 | 17.6 | 11.4 |
| Peak Exotherm, °F. | 305 | 322 | 298 | 320 |
| Brookfield Viscosity, cps (LVT #3/60 rpm) | 480 | 575 | 884 | 460 |
| Non-Volatile, wt. % | 65.1 | 66.1 | 64.4 | 67.3 |
| Acid Number (solids) | 25 | 19.4 | 17.8 | 15.2 |

*Not chain-stopped

Clear castings of resins $P_1$ to $P_4$ were made by pouring pre-promoted resins, catalyzed with 1.25% methyl ethyl ketone peroxide between two glass plates measuring 12×12 inches and spaced with ⅛ inch metal shims. The castings were allowed to cure at room temperature overnight and then post-cured at 150° F. for four hours. The physical properties of the clear resin castings are recorded in Table 2.

TABLE 2

Physical Properties of Clear Resin Castings

| Property | $P_1$ | $P_2$ | $P_3$ | $P_4$ |
|---|---|---|---|---|
| Barcol Hardness | 46 | 47 | 45 | 48 |
| Heat Deflection Temperature, °C. | 52 | 59 | 60 | 54 |
| Flexural Strength, psi | 17610 | 11165 | 10950 | 15675 |
| Flexual Modulus, × $10^5$ psi | 5.2 | 5.1 | 5.3 | 5.5 |
| Tensile Strength, psi | 9200 | 7060 | 7940 | 6485 |
| Tensile Modulus, × $10^5$ psi | 5.4 | 4.8 | 5.1 | 5.3 |
| Elongation at break | 2.2 | 1.6 | 1.7 | 1.3 |

The physical test results recorded in Table 2 were obtained in accordance with the following ASTM methods:

| Physical Test | ASTM Test No. |
|---|---|
| Barcol Hardness | D-2583 |
| Heat Distortion Temperature | D-648 |
| Flexural Strength and Modulus | D-790 |
| Tensile Strength, Modulus and Elongation | D-638 |

A series of thermal shock tests were carried out on artificial marble sink units which were molded from a composite composition of 25% resin (Resins $P_1$ to $P_4$) and 75% calcium carbonate. These resins were promoted with 0.05 weight % of 12% cobalt octoate, 0.05 weight % of 15% potassium octoate and 0.05 weight % of 2,4-pentanedione and cured with methyl ethyl ketone peroxide catalyst. The sinks were molded at ambient conditions using a 0.5 inch Gruber Company mold (#3066) and were of uniform thickness of ½ inch without overflow lines. The sinks were tested for thermal shock in accordance with a modified ANSI Z124.3 test procedure which is considered more severe than the standard ANSI test.

In this test, the sink was heated with water at a temperature of 172-178° F. flowing at a rate of 2 gallons per minute for 1.5 minutes. The sink was then allowed to drain for 30 seconds, followed immediately with cold water at 42-48° F. flowing at the same rate for 1.5 minutes. Again, the sink was allowed to drain for 30 seconds. This sequence comprised one complete cycle with a total time of 4 minutes. In all cases, sinks were subjected to continuous repetitive cycles of hot and cold water flow until cracks were seen in the resin matrix forming the sink. When the first cracks were observed, the total number of cycles the sink had undergone to that point was noted as the "cycles to failure." The results of the thermal shock test are recorded in Table 3.

TABLE 3

Thermal Shock Test Results

| Resin Matrix | Cycles to Failure |
|---|---|
| $P_1$ | 422 |
| $P_2$ | 223 |
| $P_3$ | 100 |
| $P_4$ | 373* |

*average of 3 tests, 102, 595 and 422 cycles to failure.

The thermal shock data recorded in Table III indicate that irrespective of unsaturated polyester composition variations, the sinks exhibited poor thermal shock properties.

EXAMPLE 2

In a series of runs, 80-90% by weight of benzoic acid chain stopped resins prepared in accordance with the procedure of Example 1, 10% by weight of hydroxy ethyl acrylate and 0.1% dibutyltin dilaurate were charged into a 5 liter 4-neck flask with an attached heating mantle and stirrer. The temperature was maintained at 65° C. throughout the reaction 10% by weight of isophorone diisocyanate was added to the flask over a period of 1 hour with continuous stirring. The extent of the reaction was monitored by an infrared spectra until no free isocyanate peak was present. The so-prepared urethane acrylate modified unsaturated polyester resins when formed into clear castings in accordance with the procedure of Example 1 exhibited HDT's in the order of 73-75° C. The compositions and physical properties of the cured resins at different styrene levels are summarized in Tables 4 and 5.

TABLE 4

Urethane Acrylate Modified Benzoic Acid Chain-Stopped Unsaturated Polyester Resin Composition

| | Concentration | | |
|---|---|---|---|
| Resin No. | $P_5$ | $P_6$ | $P_7$ |
| Components: | | | |
| 1st Stage | moles | | |
| Propylene glycol | — | 0.1 | 0.1 |
| Dipropylene glycol | — | 0.25 | 0.25 |
| Trimethylol propane | 0.2 | — | — |
| Neopentyl glycol | 1.0 | 0.80 | 0.80 |
| Isophthalic Acid | 0.52 | 0.63 | 0.63 |
| Maleic Anhydride | 0.38 | 0.37 | 0.37 |
| Benzoic Acid | 0.095 | 0.075 | 0.075 |
| 2nd Stage | weight ratios | | |
| Hydroxyethyl acrylate | 10 | 10 | 10 |
| Isophorone diisocyanate | 10 | 10 | 10 |
| Chain-stopped Ester | 90 | 80 | 80 |

TABLE 4-continued

Urethane Acrylate Modified Benzoic Acid
Chain-Stopped Unsaturated Polyester Resin Composition

| Resin No. | Concentration | | |
|---|---|---|---|
| | $P_5$ | $P_6$ | $P_7$ |
| Physical Properties | | | |
| Gel Time @ 77° F., (Min.) | 18.1 | 15.3 | 15.4 |
| Gel Peak, Min. | 14.4 | 9.5 | 10.2 |
| Peak Exotherm, °F. | 329 | 332 | 340 |
| Brookfield Viscosity, cps (LVT #3/60 rpm) | 435 | 676 | 300 |
| Non-Volatile, wt. % | 57.4 | 64.6 | 60.4 |
| Acid Number (solids) | 15.1 | 7.6 | 7.6 |

TABLE 5

| Physical Properties of Clear Resin Castings | | | |
|---|---|---|---|
| | $P_5$ | $P_6$ | $P_7$ |
| Barcol Hardness | 47 | 41 | 43 |
| Heat Deflection Temperature, °C. | 75 | 73 | 75 |
| Flexural Strength, psi | 17380 | 17840 | 17310 |
| Flexural Modulus, $\times 10^5$ psi | 5.6 | 4.7 | 5.5 |
| Tensile Strength, psi | 11050 | 9250 | 11145 |
| Tensile Modulus, $\times 10^5$ psi | 5.2 | 4.9 | 5.2 |
| Elongation at the break | 2.4 | 2.2 | 2.6 |

A series of thermal shock tests were carried out on marble sinks made with 25% resin (Resin $P_5$) or 30% resin (Resins $P_6$, $P_7$) following the procedure of Example 1. The sinks were tested for thermal shock in accordance with the modified ANSI Z124.3 test procedure described in Example 1. The results of the thermal shock test are recorded in Table 6.

TABLE 6

| Thermal Shock Test Results | |
|---|---|
| Resin Matrix | Cycles to Failure |
| $P_5$ | >5219 |
| $P_6$ | >2500 |
| $P_7$ | >3128 |

The thermal shock data recorded in Table 6 indicate that the sinks molded from unsaturated polyester resins having an HDT of 72° C.-75° C. in the cured state exhibited thermal shock values 5 to 10 times higher than those exhibited in sinks tested in Example 1 in which the HDT values of the cured polyester resins were in the range of 52° C.-60° C.

EXAMPLE 3

The procedure of Example 1 was repeated with the exception that higher concentrations of maleic acid, namely 0.528 moles rather than 0.325 to 0.41 moles were used to prepare the unsaturated polyester resin. The thus prepared polyester resins when formed into clear castings in accordance with the procedure of Example 1 which exhibited HDT's on the order of 72-75° C. The compositions and physical properties of the cured unsaturated polyester resins at different styrene levels are summarized in Tables 7 and 8.

TABLE 7

Benzoic Acid Chain-Stopped High Maleic Anhydride Based
Unsaturated Polyester Resin Composition

| Resin No.* | Concentration (moles) | |
|---|---|---|
| | $P_8$ | $P_9$ |
| Components | | |
| Propylene glycol | 0.094 | 0.094 |
| Dipropylene glycol | 0.234 | 0.234 |

TABLE 7-continued

Benzoic Acid Chain-Stopped High Maleic Anhydride Based
Unsaturated Polyester Resin Composition

| Resin No.* | Concentration (moles) | |
|---|---|---|
| | $P_8$ | $P_9$ |
| Neopentyl glycol | 0.748 | 0.748 |
| Isophthalic Acid | 0.402 | 0.402 |
| Maleic Anhydride | 0.528 | 0.528 |
| Benzoic Acid | 0.07 | 0.07 |
| Physical Properties | | |
| Gel Time @ 77° F., (Min.) | 11.3 | 11.8 |
| Gel Peak, Min. | 11.7 | 9.9 |
| Peak Exotherm, °F. | 362 | 380 |
| Brookfield Viscosity, cps (LVT #3/60 rpm) | 288 | 136 |
| Non-Volatile, wt. % | 61.3 | 56.8 |
| Acid Number (solids) | 10.9 | 10.9 |

*Polyester $P_8$ differs from polyester $P_9$ in that $P_8$ has a higher solids content, of 61.3% versus 56.8% for $P_9$.

TABLE 8

| Physical Properties of Clear Resin Castings | | |
|---|---|---|
| | $P_8$ | $P_9$ |
| Barcol Hardness | 42 | 40 |
| Heat Deflection Temperature, °C. | 72 | 75 |
| Flexural Strength, psi | 18200 | 18380 |
| Flexual Modulus, $\times 10^5$ psi | 4.8 | 4.9 |
| Tensile Strength, psi | 9680 | 9750 |
| Tensie Modulus, $\times 10^5$ psi | 5.1 | 4.8 |
| Elongation at the break | 2.6 | 3.1 |

A series of thermal shock tests were carried out on marble sinks which were made with 30% resin (Resins $P_8$ and $P_9$) and 70% calcium carbonate, following the procedure of Example 1 The sinks were tested for thermal shock in accordance with the modified ANSI Z124.3 test procedure described in Example 1

The results of the thermal shock test are recorded in Table

TABLE 9

| Thermal Shock Test Results | |
|---|---|
| Resin Matrix | Cycles to Failure |
| $P_8$ | >2668 |
| $P_9$ | >2668 |

The thermal shock data recorded in Table 9 indicates that the sinks molded using unsaturated polyester resins having an HDT of 72° C. in the cured state exhibited thermal shock values which were at least 4 times higher than those exhibited in the sinks tested in Example 1 in which the HDT values of the cured polyester resins were in the range of 52-60° C.

From the data it can be seen that the urethane acrylate modified benzoic acid chain-stopped unsaturated polyester resins $P_5$, $P_6$ and $P_7$ give lower peak exotherms in comparison with the $P_8$ and $P_9$ resins, and it is these lower peak exotherms which prevent mold cracking and damage.

What is claimed is:

1. A molded article having improved thermal shock resistance of at least 600 cycles to failure in accordance with the more severe form of the ANSI Test No. Z124.3, said article molded from a composite composition consisting essentially of about 60 to 80 weight % of at least one inorganic filler selected from the group consisting of calcium carbonate, kaolin, clay, talc, alumina, aluminum trihydrate, silica, diatomaceous earth, and barium sulfate; and about 20 to 40 weight % of an unsaturated polyester resin, wherein the improved thermal shock resistance is directly related to the use of an unsaturated polyester resin which when cured into a clear unfilled casting, has a heat deflection temperature of about 68° C. to 78° C.

2. The molded article of claim 1, wherein the unsaturated polyester resin is prepared by condensing at least one polyhydric alcohol with at least one ethylenically unsaturated dicarboxylic acid or anhydride.

3. The molded article of claim 2, wherein the condensation reaction is chain-stopped with a monofunctional alcohol or acid.

4. The molded article of claim 3, wherein the monofunctional acid is benzoic acid.

5. The molded article of claim 3, wherein the polyester resin is reacted with at least one diisocyanate and at least one hydroxy terminated acrylate.

6. The molded article of claim 2, wherein ethylenically unsaturated dicarboxylic anhydride is maleic anhydride.

7. The molded article of claim 2, wherein the polyhydric alcohol is selected from the group consisting of propylene glycol, dipropylene glycol, trimethylol propane neopentyl glycol.

8. The molded article of claim 5, wherein the hydroxy alkyl acrylate is hydroxy ethyl acrylate.

9. The molded article of claim 5, wherein the diisocyanate is isophorone diisocyanate.

10. The molded article of claim 1, wherein the filler is calcium carbonate.

11. The molded article of claim 1 wherein the cured resin has a heat deflection temperature of about 72° C.-75° C.

12. A process for improving the thermal shock resistance of a molded article to at least 600 cycles to failure in accordance with the more severe form of the ANSI Test No. Z124.3, by molded the article from a composite composition consisting essentially of about 60 to 80 weight % of at least one inorganic filler selected from the group consisting of calcium carbonate, kaolin, clay, talc, alumina, aluminum trihydrate, silica, diatomaceous earth, and barium sulfate; and about 20 to 40 weight % of an unsaturated polyester resin, wherein the improved thermal shock resistance is directly related to the use of an unsaturated polyester resin which when cured into a clear unfilled casting, has a heat deflection temperature of about 68° C. to 78° C.

13. The process of claim 12, wherein the unsaturated polyester resin is prepared by condensing at least one polyhydric alcohol with at least one ethylenically unsaturated dicarboxylic acid or anhydride.

14. The process of claim 13, wherein the condensation reaction is chain-stopped with a monofunctional alcohol or acid.

15. The process of claim 14, wherein the monofunctional acid is benzoic acid.

16. The process of claim 14, wherein the polyester resin is reacted with at least one diisocyanate and at least one hydroxy terminated acrylate.

17. The process of claim 13, wherein the ethylenically unsaturated dicarboxylic anhydride is maleic anhydride.

18. The process of claim 13, wherein the polyhydric alcohol is selected from the group consisting of propylene glycol, dipropylene glycol, trimethylol propane and neopentyl glycol.

19. The process of claim 16, wherein the hydroxy alkyl acrylate is hydroxy ethyl acrylate.

20. The process of claim 12, wherin the filler is calcium carbonate.

21. The process of claim 12, wherein the cured resin has a heat deflection temperature of about 72° C.-75° C.

22. A bathroom sink molded in accordance with the process of claim 12.

* * * * *

UNITED STATES PATENT AND TRADEMARK OFFICE
CERTIFICATE OF CORRECTION

PATENT NO. : 5,177,127

DATED : January 5, 1993

INVENTOR(S) : Katari S. Raju

It is certified that error appears in the above-identified patent and that said Letters Patent is hereby corrected as shown below:

| | |
|---|---|
| At Column 1, Line 56 | change "in" to --on-- |
| At Column 5, Line 42 | change "Flexual" to --Flexural-- |
| At Column 8, Line 29 | change "Tensie" to --Tensile-- |
| At Column 8, Line 35 | after "Example 1" insert --.-- |
| At Column 8, Line 37 | after "Example 1" insert --.-- |
| At Column 8, Line 39 | after "Table" insert --9.-- |

UNITED STATES PATENT AND TRADEMARK OFFICE
CERTIFICATE OF CORRECTION

PATENT NO. : 5,177,127

DATED : January 5, 1993

INVENTOR(S) : Katari S. Raju

It is certified that error appears in the above-identified patent and that said Letters Patent is hereby corrected as shown below:

At Column 9,   change "molded"
Line 38       to --molding--

Signed and Sealed this

Ninth Day of November, 1993

*Attest:*

BRUCE LEHMAN

*Attesting Officer*   *Commissioner of Patents and Trademarks*